US006263898B1

(12) United States Patent
Vanderveen et al.

(10) Patent No.: US 6,263,898 B1
(45) Date of Patent: Jul. 24, 2001

(54) THROTTLE SHAFT WITH RETURN SPRING AND SPRING COVER AND METHOD OF ASSEMBLING THE SAME

(75) Inventors: James Vanderveen, Blenheim (CA); Paul D. Daly, Troy, MI (US); Rosario Di Ponio, Windsor (CA)

(73) Assignee: Siemens Canada Limited, Ontario (CA)

( * ) Notice: Subject to any disclaimer, the term of this patent is extended or adjusted under 35 U.S.C. 154(b) by 0 days.

(21) Appl. No.: 09/369,478

(22) Filed: Aug. 6, 1999

(51) Int. Cl.[7] .......... F16K 31/00

(52) U.S. Cl. .......... 137/15.25; 251/263; 251/308; 251/294; 251/313; 251/337

(58) Field of Search .......... 251/313, 308, 251/305, 337, 263, 294; 137/15.25

(56) References Cited

U.S. PATENT DOCUMENTS

| | | | | |
|---|---|---|---|---|
| 4,285,499 | * | 8/1981 | Zukausky | 251/294 X |
| 4,625,943 | * | 12/1986 | Groger | 251/337 X |
| 4,840,349 | * | 6/1989 | Peter et al. | 251/294 X |
| 4,867,415 | * | 9/1989 | Andrea | 251/337 |
| 4,880,207 | * | 11/1989 | Matsumoto et al. | 251/305 X |
| 5,168,852 | * | 12/1992 | Moriguchi et al. | 251/337 X |
| 5,263,449 | * | 11/1993 | Swartzendruber | 251/294 X |
| 5,509,396 | * | 4/1996 | Tamaki | 251/337 X |
| 5,522,361 | * | 6/1996 | Pickman et al. | 251/305 X |
| 5,666,988 | * | 9/1997 | Becker | 251/308 X |
| 5,685,521 | * | 11/1997 | Yoshida et al. | 251/313 |
| 5,762,044 | * | 6/1998 | Hollister et al. | 251/313 X |
| 5,878,715 | * | 3/1999 | Hernandez et al. | 251/305 X |
| 5,996,551 | * | 12/1999 | Schroder | 251/313 X |

* cited by examiner

*Primary Examiner*—Kevin Shaver
*Assistant Examiner*—John Bastianelli

(57) ABSTRACT

A throttle shaft assembly includes throttle shaft with a cam and shaft portion the shaft portion configured to be inserted in the throttle body, a throttle return spring that is coiled around the throttle shaft with two ends one end engaged to the cam portion and the other end engaged to a spring support on the throttle body, and a throttle spring cover that substantially surrounds the throttle return spring and is slideably mounted on the throttle shaft. The throttle return spring can be preloaded and restrained at both ends on the throttle shaft assembly thus preventing the preload from being released as the throttle shaft assembly is inserted into the throttle body. One end of the spring can be released to engage a portion of the throttle body thus reducing a portion of the preload. The cover had several flexible fingers that engage a groove in the throttle shaft and prevent the cover from sliding off thus exposing the spring.

10 Claims, 2 Drawing Sheets

Fig-4
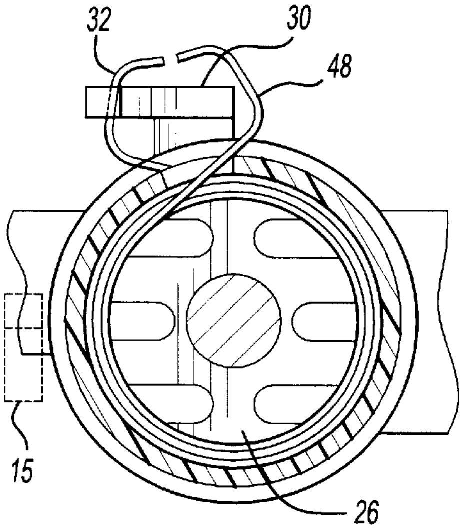
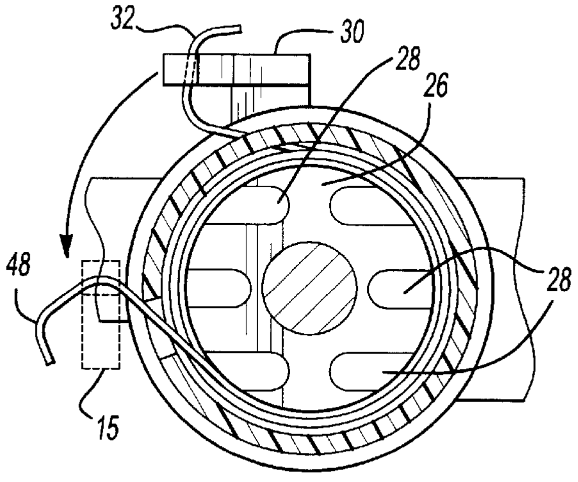
Fig-5
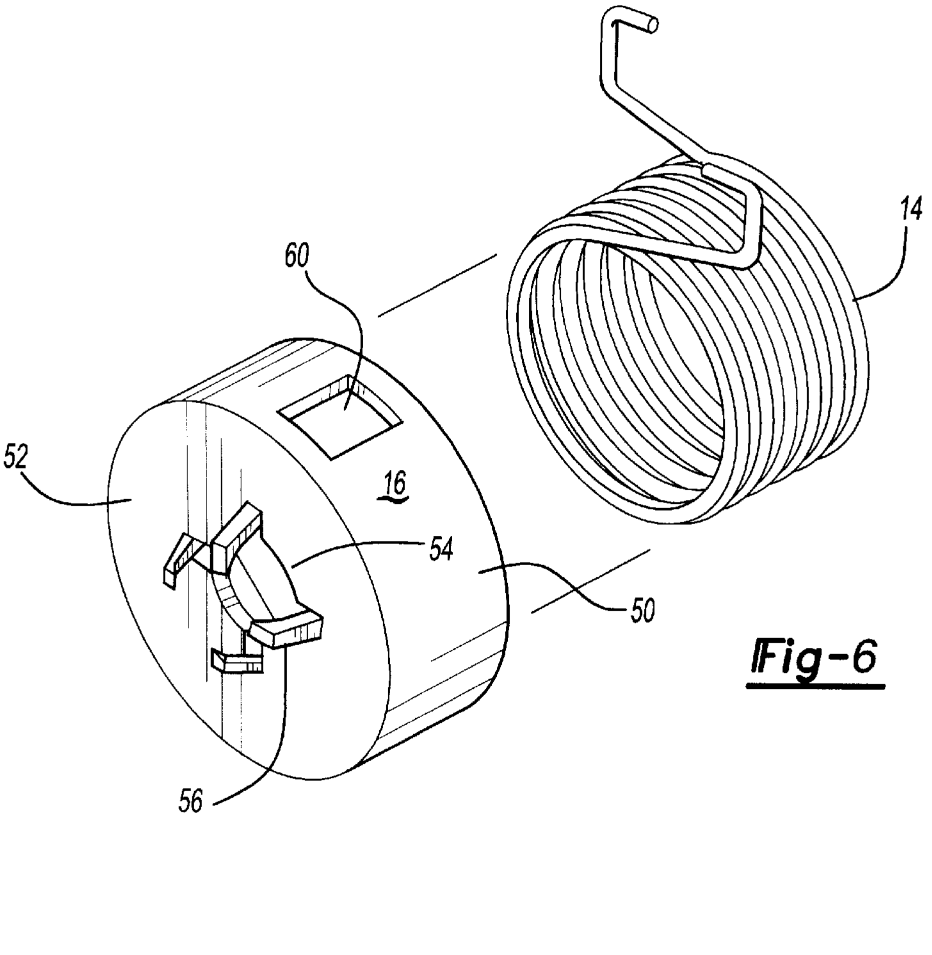
Fig-6

THROTTLE SHAFT WITH RETURN SPRING AND SPRING COVER AND METHOD OF ASSEMBLING THE SAME

FIELD OF THE INVENTION

The present invention relates generally to combustion air induction systems for internal combustion engines of vehicles. More particularly, it relates to throttle valves for such air induction systems and methods for assembling them.

BACKGROUND OF THE INVENTION

Internal combustion engines are often provided with a throttle valve within their combustion air induction systems to control combustion airflow rate. The throttle valve is typically in the form of a butterfly valve, having a disk secured to a throttle shaft which is journaled to the generally cylindrical internal wall surface of a throat of a throttle body. The diameter of the disk is only slightly smaller than is the inside diameter of the throat, whereby the throttle plate may block all but a small portion of the air from passing through the throat in an idle condition. Typically, a return spring is used to bias the throttle shaft and butterfly closed with respect to the throat, shutting off almost all the airflow through the throttle valve.

The return springs of such throttle valves are assembled such that they provide a predetermined preload to the throttle shafts. This preload is carefully selected to provide a sufficient force to close the throttle valve when the throttle valve actuating device is released, yet not to provide a force that substantially resists the throttle valve actuating device. Such devices typically include mechanical links, cables or motors attached to an arm extending from the throttle shaft.

Traditional return springs are difficult to assemble quickly and accurately. They are most commonly coil springs that are coiled loosely about the throttle shaft to permit them to be readily tightened or loosened as the throttle shaft is rotated and the valve is opened and closed, respectively. When a throttle valve is assembled, the return spring must first be placed about the throttle shaft. Once it is in position the throttle shaft is then inserted into the throttle body. During this process the free ends of the spring must be twisted about the shaft to apply the proper preload to the spring. While the ends of the spring are being held with the appropriate amount of preload, one end must be transferred to the throttle body and the other end must be transferred to the throttle shaft. In this manner, the preload applied to the spring is transmitted to the throttle body and the throttle shaft. By transferring the ends of the spring to the throttle shaft and throttle body, the preload functions to hold the throttle shaft closed with respect to the throttle body. If a free end of the spring is released prematurely, the spring can rapidly and partially uncoil, causing the preload to be dissipated. This typically requires that the shaft be withdrawn from the throttle body, the spring recoiled, and the shaft reinserted in the throttle body.

What is needed, therefore, is a more efficient method for assembling a throttle valve and an improved throttle valve construction that will permit the throttle valve to be assembled more rapidly and conveniently while reducing the risk that the spring will uncoil.

SUMMARY OF THE PRESENT INVENTION

In accordance with a first embodiment of the invention, a throttle shaft assembly is provided for insertion into a throttle body to form a throttle valve including a swaddle shaft having a cam portion coupled to a shaft portion wherein the shaft portion is configured to be inserted into a throttle body, a throttle return spring coiled about the throttle shaft and having first and second ends. The first end engaged to the cam portion of the throttle shaft and the second end configured to engage a spring support on a throttle body, and a throttle spring cover substantially surrounding the throttle return spring and slideably mounted on the throttle shaft. The spring may be a cylindrically coiled spring with a first end extending through an aperture in the cover. The throttle spring cover may have a plurality of radially inwardly extending cover supports and the throttle shaft may have a circular groove where the fingers are adapted to slideably engage the circular groove. The cam portion of the throttle shaft assembly may include a spring support configured to engage the second end of the spring. The cam may be configured to restrain both the first and second ends of the spring whereby the spring is maintained in a preloaded condition. The cam and spring may also be configured to release the second end of the spring onto a spring support on the throttle body.

In accordance with the second embodiment of the invention a method of installing a throttle shaft assembly including a throttle shaft with cam portion, a throttle return spring configured to be coiled about the throttle shaft and a cover substantially surrounding the coil spring and coupled to the throttle shaft is provided including the steps of inserting the throttle return spring into the cover, inserting the throttle shaft through an aperture in the cover, and sliding the spring and cover down the throttle shaft. This method may include the step of inserting a free end of the spring through an aperture in the cover. It may also include the step of engaging the first end of the spring with the cam portion. The method may include the step of engaging the first end of the spring with the cam to restrain its free circumferential rotation about the throttle shaft in a first direction, preloading the spring by coiling the spring tighter, and engaging a second end of the preloaded spring with the cam portion to restrain its free circumferential rotation about the throttle shaft in a second direction opposite the first direction. The method may also include inserting the throttle shaft into a throttle body and transferring a preload of the preloaded spring from the throttle shaft to the throttle body. The step of transferring the preload may include the steps of releasing the second end of the spring from the cam to permit it to rotate in the second direction, rotating the spring to permit a partial release of the preload, and engaging the second end of the spring with a throttle body to limit further rotation in the second direction and further release of preload.

Other principal features and advantages of the invention will become apparent to those skilled in the art upon review of the following drawings, the detailed description and the appended claims.

BRIEF DESCRIPTION OF THE DRAWINGS

FIGS. 4 and 5 are partial cross-sectional views of the throttle shaft assembly of FIG. 1 showing the return spring in two positions, a first position (FIG. 4) in which both ends of the return spring are restrained by the throttle shaft, and a second position (FIG. 5) in which one end of the spring has been released from the throttle shaft, has unwound and is restrained by the throttle body; and FIG. 6 is an exploded perspective view of the cap and spring of FIG. 1.

Figure 1:
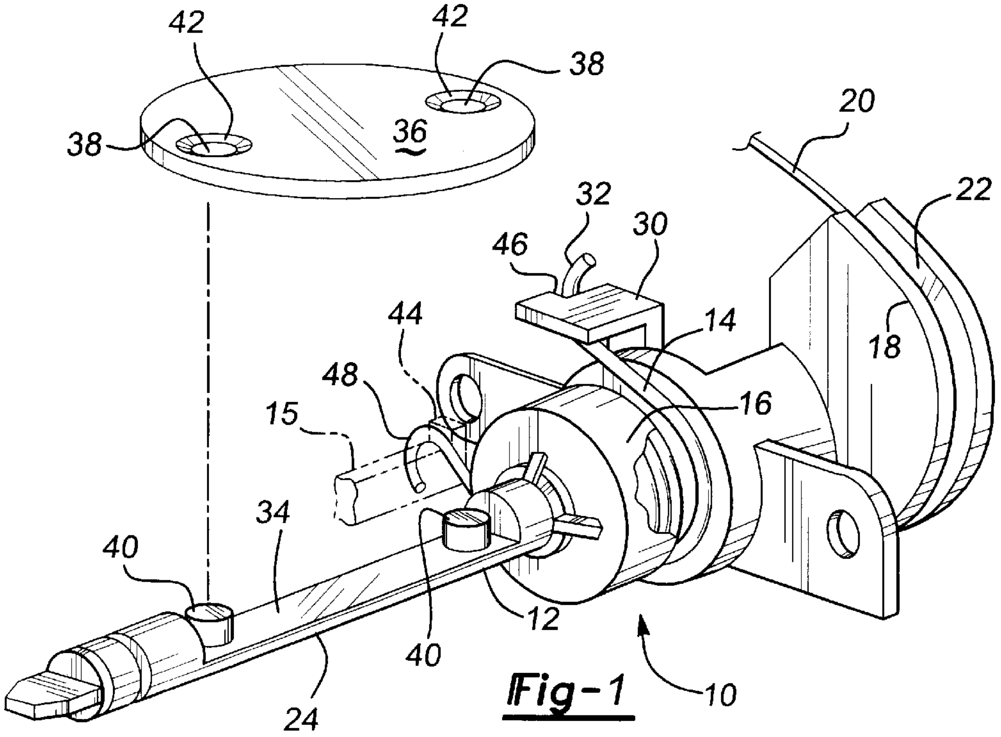
FIG. 1 is a perspective view of a throttle shaft assembly having a throttle shaft, a return spring coiled about the throttle shaft, and a cap surrounding the return spring as well a fragmentary view of a spring retainer portion of a throttle body.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Referring to FIG. 1, a side view of a throttle shaft assembly 10 showing a throttle shaft 12 on which a return spring 14 is mounted. A cap 16 is provided that encloses several outer turns of return spring 14. Throttle shaft 12 is supported for rotation in a throttle body (not shown). A spring retainer portion 15 of the throttle body is shown in the position when throttle shaft 12 is inserted into the throttle body and is in a closed position.

Throttle shaft 12 has a throttle lever (shown as a cam 18) that is provided to engage with a throttle valve actuating device (shown as a cable 20). Alternative actuating devices include motors, either linear or rotary, a torsion cable, a mechanical linkage, etc. As illustrated in FIG. 1, cable 20 rests in a groove 22 formed in the outer surface of cam 18 that guides cable 20 when it is pulled and prevents it from slipping off throttle shaft 12. Cable 20 is configured to be attached to an accelerator pedal in an automobile at its other end.

In use, the throttle shaft actuating device, whether cable, motor, or mechanical linkage, pulls the throttle lever or cam causing the throttle shaft to rotate inside the throttle body. The rotating force provided by the throttle shaft actuating device is resisted by throttle return spring 14, which has one end coupled to spring retainer 15 on the throttle body and the other end coupled on throttle shaft 12. When the force applied by the throttle shaft actuating device is released, throttle return spring 14 rotates throttle shaft 12 back to its closed position. To insure that return spring 14 returns throttle shaft 12 to its fully closed position, return spring 14 is preloaded when throttle shaft 12 is in its closed position.

Cam 18 is attached to shaft portion 24. Shaft portion 24 extends into the throttle body (not shown). Shaft portion 24 has a circular cross section that permits it to be supported for rotation within the throttle body. By rotating within the throttle body, shaft portion 24 opens and closes the throttle valve in a conventional manner.

Cam 18 has a spring supporting length 26. Spring supporting length 26 has an outer diameter slightly smaller than the coiled inner diameter of return spring 14. The slight difference between the outer diameter and the inner diameter of spring 14 permits spring 14 to be tightened when the shaft is rotated without binding on spring supporting length 26. Spring supporting length 26 has a larger diameter than shaft portion 24 to permit return spring 14 with a relatively large diameter to be employed. This larger diameter of return spring 14 permits it to provide a more constant spring force as it is tightened when throttle shaft 12 is rotated to an open position. Spring support 26 preferably has a cylindrical outer surface with a length substantially the same as the inside diameter of return spring 14, but allowing a small clearance to prevent binding of spring 14 on shaft 12. To reduce the mass of throttle shaft 12, and to reduce shrinkage when throttle shaft 12 is molded out of plastic, a plurality of longitudinally extending recesses 28 may be provided in spring support 26.

Cam 18 also includes an arm 30 that engages an end 32 of return spring 14. Arm 30 prevents return spring 14 from unwinding by abutting end 32 of return spring 14.

A central portion of throttle shaft 12 has a generally semicircular cross-section that defines a mounting flap 34 to which a throttle plate 36 is attached. Throttle plate 36 is disposed in the throat of the throttle body to open and close the throttle body when throttle shaft 12 is rotated. When cable 20 is pulled, arm 30 responds by rotating. Arm 30, in turn, rotates shaft 24, which in turn rotates mounting flap 34 to which throttle plate 36 is attached.

Throttle plate 36 is preferably made of plastic and has two holes 38 that are adapted to receive bosses 40 which extend from mounting flap 34. When the throttle body is assembled, shaft portion 24 is inserted into the throttle body such that it intersects the throat of the throttle body. In this position, throttle plate 36 can be inserted into the throat of the throttle body and coupled with throttle shaft 12 such that bosses 40 extend through holes 38. In this position, bosses 40 may be partially melted such that they fill in chamfers 42 of holes 38 and bond throttle plate 36 to throttle shaft 12. While this is the preferred method of attachment, other methods such as metal fasteners, rivets, screws or the like may be employed.

Return spring 14 is in the form of a cylindrical coil having two ends extending outward away from the longitudinal axis of the spring that engage arm 30 on throttle shaft 12 and spring retainer 15 extending from the throttle body. When cable 20 is pulled, throttle shaft 12 rotates in the counterclockwise direction (as shown in FIG. 1). This causes arm 30, which extends from throttle shaft 12, to also rotate in the counterclockwise direction. Spring 14 is disposed on throttle shaft 12 such that it is placed in tension and is wound tighter (i.e., the potential energy of the spring increases) by the motion of arm 30. When cable 20 is released, this tension in spring 14 causes throttle shaft 12 to rotate back to the position shown in FIG. 1, thereby closing the valve. To ensure that throttle shaft 12 is substantially closed, spring 14 is preloaded in the valve closed position (as shown in FIG. 1). The manner in which this preload is provided will be described in more detail below. To ensure that spring 14 remains in the proper position and is not inadvertently released, indentations 44 and 46 are provided on spring retainer 15 and arm 30, respectively. These indentations are disposed to prevent end 32 of spring 14 from sliding off arm 30, and to prevent an end 48 of spring 14 from sliding off spring retainer 15.

Figure 2:
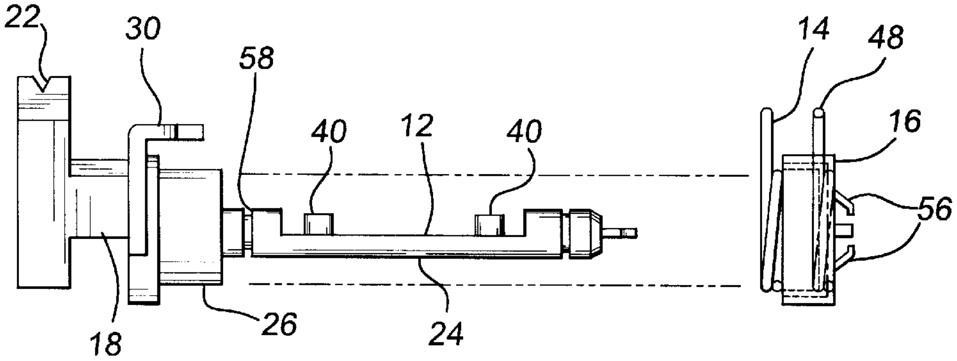
FIG. 2 is a partially exploded side view of the throttle shaft assembly of FIG. 1.

Cap 16 is provided to enclose a portion of the outer surface of spring 14. This serves several functions. First, it reduces contamination and dirt accumulation on spring 14. Second, it supports spring 14 during the assembly of the throttle valve. Cap 16, as best shown in FIGS. 1 and 6, has a substantially cylindrical portion 50 that is enclosed on one end by an end cover 52. End cover 52 has an opening 54 through which shaft 12 is inserted. Several flexible fingers 56 extend inward from end cover 52 to engage a circular recess 58 in shaft 12. Circular recess 58 preferably extends completely around the periphery of shaft 12 to permit cap 16 to rotate with respect to shaft 12. Fingers 56 and recess 58 are preferably disposed such that when they are engaged cap 16 is held in a position in which it substantially covers spring 14. Fingers 56 are arranged with respect to end cover 52 such that they deflect outward around shaft 12 when cap 16 is inserted on shaft 12 (as shown in FIG. 2). In this manner, cap 16 can be slid onto the end of shaft 12 with fingers 56 being deflected outward until they reach recess 58. Once the fingers have reached recess 58, they snap into recess 58 and substantially prevent cap 16 from being removed. Cap 16 is provided with an opening 60 through which the free end of spring 14 (adjacent end cover 52) extends. Opening 60 may be enclosed, or may be in the form of a recess or a notch extending inward from a free edge of cap 16.

Figure 3:
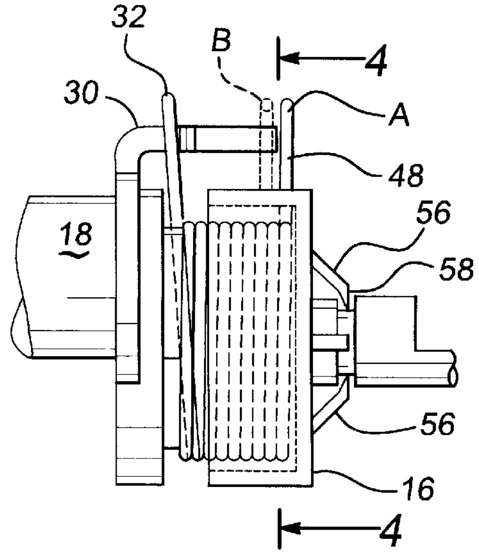
FIG. 3 is a detail view of the throttle shaft assembly of FIG. 2, showing the return spring engaged on the throttle shaft in two positions, including a first position "A" in which one end of the spring is free, and a second position "B" in which both ends of the spring are retained by the throttle shaft.

To assemble throttle shaft assembly 10, spring 14 is inserted inside cap 16 such that end 48 of spring 14 extends through opening 60. This cap and spring assembly is then inserted onto the free end of shaft 12 (as shown in FIG. 2), until fingers 56 of cap 16 are engaged in recess 58. At this point, end 48 of spring 14 is in position "A" (as shown in FIG. 3) while end 32 of spring 14 abuts arm 30.

Once in this position, the operator may grasp cap 16 and spring 14 and may rotate them in the counterclockwise direction (as shown in FIG. 4) until a sufficient preload is placed on spring 14. At this point, the operator may move end 48 of spring 14 axially toward cam 18 until it reaches position "B" (as shown in FIG. 3). In this position, end 48 of spring 14 is restrained by a member (shown as arm 30) extending from throttle shaft 12. With both ends of spring 14 restrained by structures on throttle shaft 12, the preload that was applied to spring 14 will not be released but will be maintained by throttle shaft 12.

Once both ends of spring 14 are restrained, as described in the preceding paragraph, throttle shaft 12 can be easily inserted into the throttle body with little risk that spring 14 will unwind prematurely (thus releasing the preload). Once in the throttle body, one end of spring 14 should be engaged with the throttle body to hold throttle shaft assembly 10 in a closed position with respect to the throttle body.

In a preferred embodiment, and as shown in FIG. 4, when throttle shaft assembly 10 is completely inserted into the throttle body, spring retainer 15 fixed with respect to the throttle body, and preferably extending therefrom, is adjacent to throttle shaft assembly 10. In this position, with throttle shaft assembly 10 substantially inserted within the throttle body, the operator may grasp end 48 of spring 14 and slide it from position "B" to position "A". In position "A", end 48 will be released from being restrained on throttle shaft assembly 10 and will rotate in the counterclockwise direction (as shown in FIG. 5) as tension in spring 14 is released until end 48 abuts spring retainer 15. In this manner, throttle shaft assembly 10 will assume the position shown in FIG. 5 and in FIG. 1.

Thus, it should be apparent that there has been provided in accordance with the present invention a throttle shaft with return spring and spring cover and a method of assembling the same that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A throttle shaft assembly for insertion into a throttle body to form a throttle valve, comprising:

a throttle shaft having a cam portion coupled to a shaft portion wherein the shaft portion is configured to be inserted into a throttle body;

a throttle return substantially cylindrically coiled spring coiled about the throttle shaft and having first and second ends, the first end engaged to the cam portion of the throttle shaft and the second end configured to engage a spring support on the throttle body; and a throttle spring cover having a substantially cylindrical portion substantially surrounding the throttle return spring and slideably mountable on the throttle shaft, said throttle shaft having a circular groove, the substantially cylindrical portion defining a spring opening engageable with the first end, the throttle spring cover having a plurality of radially inwardly extending cover adapted to slideably engage the circular groove.

2. The throttle shaft assembly of claim 1, wherein the spring opening is an aperture.

3. The throttle shaft assembly of claim 1, wherein the spring opening is a notch.

4. The throttle shaft assembly of claim 1, wherein the cam portion further comprises the spring support configured to engage the second end of the spring.

5. The throttle shaft assembly of claim 4, wherein the cam is configured to restrain both the first and second ends of the spring whereby the spring is maintained in a preloaded condition.

6. The throttle shaft assembly of claim 5, wherein the cam and spring are configured to release the second end of the spring onto the spring support.

7. A method of installing a throttle shaft assembly including a throttle shaft with cam portion, a throttle return spring configured to be coiled about the throttle shaft and a cover substantially surrounding the coil spring and coupled to the throttle shaft, including the steps of:

inserting the throttle return spring into the cover;

inserting the throttle shaft through a shaft aperture in the cover;

inserting a free end of the spring through a spring aperture in a substantially cylindrical portion of the cover;

engaging the first end of the spring with the cam portion to restrain its free circumferential rotation about the throttle shaft in a first direction;

preloading the spring by coiling the spring tighter;

sliding the spring and cover down the throttle shaft; and engaging a second end of the preloaded spring with the cam portion to restrain its free circumferential rotation about the throttle shaft in a second direction opposite the first direction.

8. The method of claim 7, further comprising the step of:

engaging a first end of the spring with the cam portion.

9. The method of claim 7, further comprising the steps of:

inserting the throttle shaft into a throttle body; and transferring a preload of the preloaded spring from the throttle shaft to the throttle body.

10. The method of claim 9, wherein the step of transferring the preload includes the steps of:

releasing the second end of the spring from the cam to permit it to rotate in the second direction;

rotating the spring to permit a partial release of preload; and engaging the second end of the spring with the throttle body to limit further rotation in the second direction and further release of preload.

* * * * *